Dec. 26, 1961 J. E. STORCK 3,014,811
APPLICATION OF A DRAWING LUBRICANT TO A SHEET-METAL SURFACE
Filed April 3, 1959 2 Sheets-Sheet 1

INVENTOR.
JACK E. STORCK
BY
Gordon C. Clark
ATTORNEY

Dec. 26, 1961 J. E. STORCK 3,014,811

APPLICATION OF A DRAWING LUBRICANT TO A SHEET-METAL SURFACE

Filed April 3, 1959 2 Sheets-Sheet 2

INVENTOR.

JACK E. STORCK

BY

Gordon C. Clark

ATTORNEY

United States Patent Office 3,014,811
Patented Dec. 26, 1961

3,014,811

APPLICATION OF A DRAWING LUBRICANT TO A SHEET-METAL SURFACE

Jack E. Storck, Alliance, Ohio, assignor to Allianceware, Inc., Alliance, Ohio, a corporation of Delaware
Filed Apr. 3, 1959, Ser. No. 803,891
7 Claims. (Cl. 117—8)

This invention relates to the application of a drawing lubricant to a sheet-metal surface. It includes the process and apparatus therefor.

Drawing lubricant is applied to one or both surfaces of sheet metal before the metal is pressed to shape. It is a liquid or pasty composition, and a very thin coating is all that is required. Some such compositions contain aqueous or organic solvent that is evaporated after application to the metal. It is customary to heat the metal surface before, or both before and after applying the lubricant to insure penetration of the lubricant into the metal surface. If the drawing compound contains solvent, the treated sheet is heated to evaporate the solvent.

Unless the lubricant is applied uniformly and only in the amount required, there is unnecessary waste of the lubricant. According to the invention, a very thin and uniform coating of the lubricant is applied to the metal surface, and the operation is not only very efficient, but it is also most economical.

The lubricant is applied to the surface by flowing or spraying it on to the surface or applying it to the surface in any other convenient manner in an amount in excess of that required. The coated surface is then subjected to the pressure of a notched distributor, preferably in the form of a grooved roll. The grooves separate the lubricant into elongated threads of substantially constant width and height which subsequently flow together to provide a continuous coating of uniform thickness over the entire metal surface.

As the distributor is pressed against the coated metal surface, it is compressed and the cross-sectional area of each groove is reduced. The amount of lubricant on the metal as it reaches the distributor is more than enough to fill the grooves, but the amount which adheres to the metal during and after contact with the distributor depends upon the cross-sectional area of the grooves. By increasing or decreasing the pressure of the distributor against the treated surface, the size of the grooves and consequently the amount of lubricant left on the metal by the distributor is decreased or increased.

If both sides of the sheet metal are to be treated with lubricant, as is usual, the metal is advantageously passed between two resilient grooved rolls. Whatever the form of the distributor, it is advantageously pressed against the metal surface by an air cylinder because such pressure is the same regardless of the thickness of the metal sheet.

The invention will be described in connection with the accompanying drawings, which show the metal being treated as it is passed between two grooved rolls. A drier is shown such as might be employed for metal treated with an aqueous compound.

In the drawings—

Figure 1:
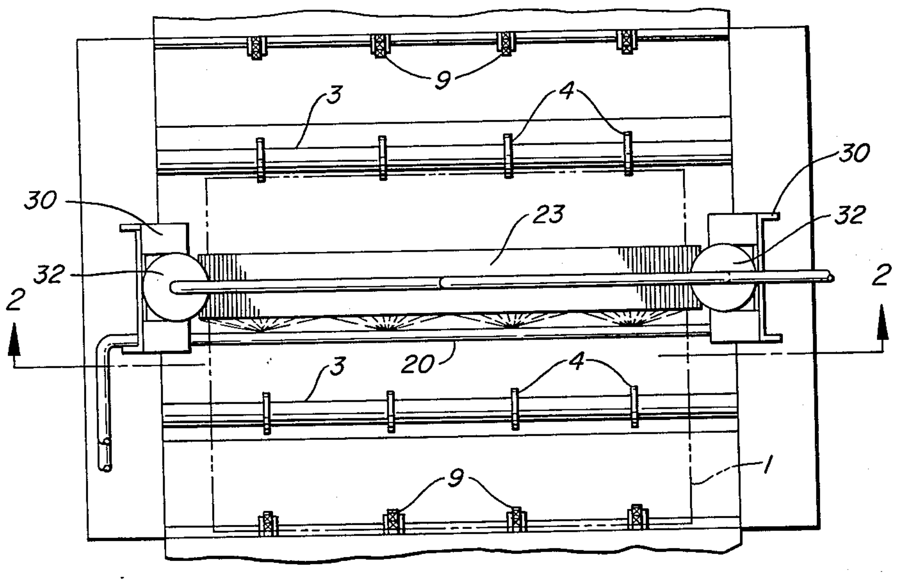
FIG. 1 is a plan view of the lubricant-applying equipment.
Figure 2:
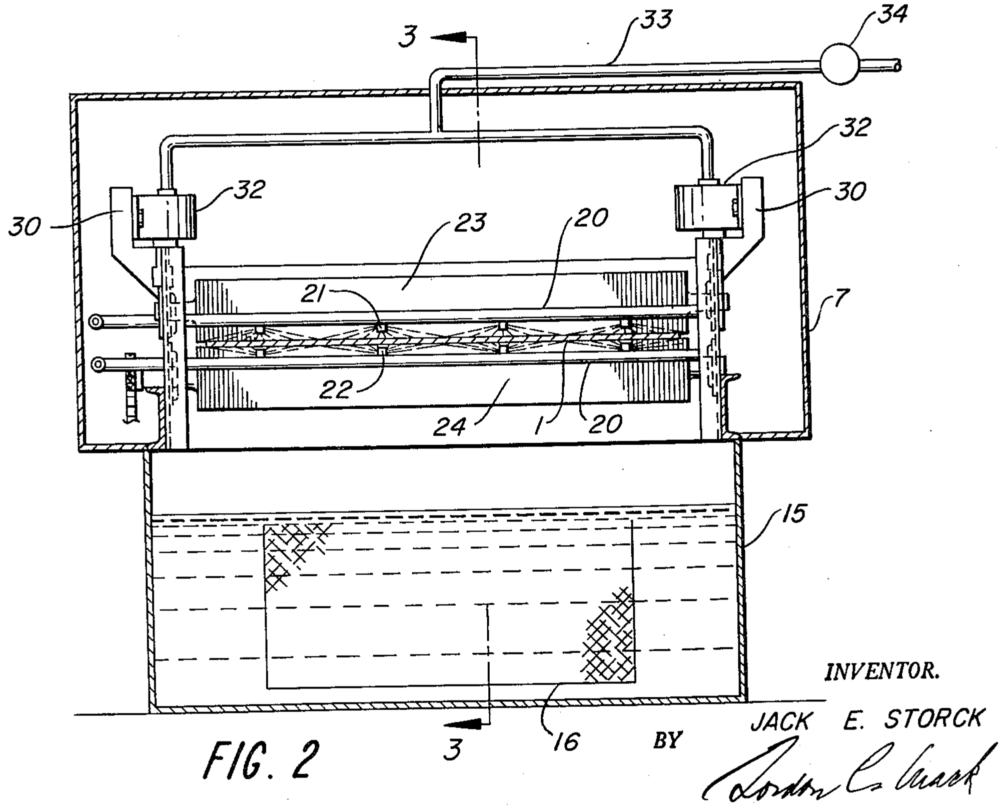
FIG. 2 is an elevation on the line 2—2 of FIG. 1.
Figure 3:
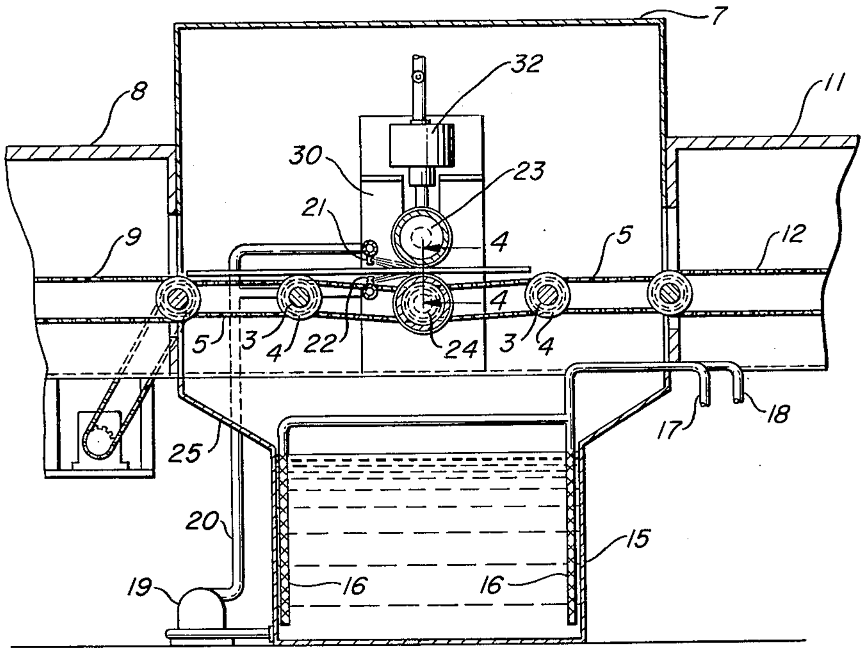
FIG. 3 is a vertical section on the line 3—3 of FIG. 2.

In the drawings, the sheet metal 1 which is to be lubricated is carried on roll 3 equipped with washers 4 located at intervals, which support the sheet metal. These rolls are driven by the sprocket chain drives 5. The metal is delivered to the treating cabinet 7 from the preheating cabinet 8 on the conveyor chain 9 and then delivered from the treating cabinet to the drier cabinet 11 by the conveyor chain 12. Any suitable type of heating means can be located in the cabinets 8 and 11. It may, for example, be a large resistance wire or coil located above and below the conveyor chain to radiate the necessary heat in each cabinet.

The lubricant composition is contained in the tank 15 which is heated by the steam coils 16 supplied by the line 17. The used steam is exhausted through the pipe 18. The temperature required in the tank depends upon the composition of the drawing compound. It is removed from the tank by pump 19 and delivered through the manifold 20 to the spray nozzles 21 and 22 from which it is sprayed, as indicated, on to the sheet metal immediately before it enters between the upper and lower coating rolls 23 and 24. Excess lubricant flows over the edges of the sheet and over the rear end of the sheet back into the tank; any excess caught by the apron 25 drains thence back into the tank.

Figure 4:
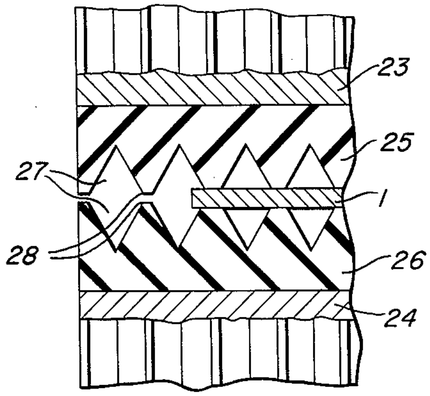
FIG. 4 is an enlarged section on the line 4—4 of FIG. 3 showing slight compression of the roll surfaces when a small pressure is applied.
Figure 5:
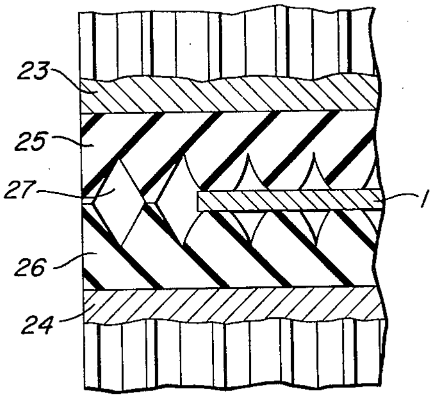
FIG. 5 is a view of the same with greater compression of the roll surfaces when a higher pressure is applied.

The coating rolls 23 and 24 are covered with rubber or other resilient coating 25 and 26. The surface of each roll is grooved with grooves 27 which are very close together. These grooves may be distinct from one another, or the groove may be a continuous groove with spirals from one end of the roll to the other. The grooves are shown as V-shaped. This is not necessary because pressure applied to grooves of any shape reduces the volume of the grooves and this is what controls the amount of drawing compound left on the sheet. The surfaces 28 between the grooves are flat because pointed surfaces tend to deflect in one direction or the other as pressure is applied and this changes the volume of the grooves. FIGURE 4 shows how the coverings on the rolls are somewhat compressed as a relatively light pressure is applied, and FIG. 5 shows how the grooves are compressed to a much smaller volume when a relatively greater pressure is applied. The pressure applied determines the amount the grooves are compressed, and thus the volume of lubricant retained in each groove as it contacts the sheet metal.

As the sheet of metal passes from the coating rolls, most of the lubricant composition in the grooves is deposited on the metal and then spreads evenly over the metal surfaces. The grooves are very small, measuring, for example, 1/16 inch across and being, for example, 1/16 inch deep. However, the size of the grooves is not critical and they may be somewhat larger or smaller, depending upon the amount of lubricant which is to be deposited on the metal surface. This in turn depends upon the composition of the lubricant and the amount of solvent it contains. The solvent is evaporated in the drying chamber 11, leaving a very thin and uniform coating on the metal surface.

The lower coating roll 24 is mounted in fixed bearings in the mounting frames 30. The top coating roll 23 is mounted in floating bearings also held in the mounting frames. The rolls are pressed together by air pressure (or other fluid pressure) from the pressure cylinders 32. Air (or other fluid) is supplied to the cylinders through the feed line 33 equipped with the pressure regulator 34. Regardless of the thickness of the metal sheets, the same amount of lubricant is deposited at any given pressure of the air (or other fluid).

In an efficient operation the pump 19 is operated continuously. This sprays lubricant through the nozzles 21 and 22 continuously. When there is no sheet metal to interrupt the flow of the lubricant from the nozzles, it is returned directly to the tank. When the flow of lubricant is intercepted by a sheet of metal carried between the rolls on the conveying system, the grooves in the rolls regulate the amount of lubricant which passes between the rolls and adheres to the sheet as it leaves the rolls. The excess is eventually returned to the tank. The sheet is preheated in the chamber 8, and solvent in the lubricant is volatilized in the chamber 11. If an organic solvent, it is recovered in any suitable recovery system. If the drawing lubricant be a solvent-free oil, the sheet need not be heated after passing between the distributor rolls.

The drawings and description are illustrative. The invention is covered in the claims which follow.

What I claim is:

1. In a machine for spreading drawing lubricant on a sheet metal surface, which machine includes in combination a distributor with a resilient surface which is notched from one edge thereof to the other, and means for producing relative movement between said surface and a metal surface, means for supplying drawing lubricant to the metal surface and therafter pressing said surface of the distributor and the metal surface into contact with sufficient presusre to reduce the volume of said notches while the resilient surface and metal surface are moved relatively to one another whereby a predetermined ratio is maintained between the width of the notched area and the width of the area of contact between the distributor and the metal surface in every edge to edge section through said area of contact and the amount of lubricant remaining on the surface is controlled.

2. In a machine for spreading drawing lubricant on a sheet metal surface, the combination of means for supplying lubricant to the metal surface, a resilient pad with means for bringing it into rolling contact with the metal surface and means for moving the pad in such contact therewith, the surface of the pad containing closely spaced, narrow, elongated grooves lying generally parallel to the direction of said movement, more or less lubricant being required to fill each groove as the pad and metal are brought into less and greater pressure contact, respectively.

3. In a machine for spreading drawing lubricant on both surfaces of a metal sheet, the combination of two parallel rolls with resilient surfaces, means for pressing them against opposite surfaces of the metal sheet and means for rotating the rolls and thereby moving the metal between them, the surface of each roll containing closely spaced, narrow, elongated grooves which encircle the respective rolls, and means for supplying lubricant to the sheet metal ahead of the rolls.

4. In a machine for spreading drawing lubricant on a sheet metal surface, the combination of a resilient pad and means for bringing it into rolling contact with a surface of the metal and means for moving the pad in such contact therewith, the surface of the pad containing closely spaced, narrow, elongated grooves lying generally parallel to the direction in which the pad is moved, means for applying lubricant to the metal surface ahead of the pad, an air cylinder for pressing the pad and metal surface into contact, and means for regulating the pressure of the air in the cylinder and thus controlling the amount the grooves are compressed which in turn controls the amount of lubricant left on the surface.

5. In a machine for spreading drawing lubricant on both surfaces of a metal sheet, the combination of two parallel rolls with resilient surfaces, an air cylinder and air-pressure means for pressing them against opposite surfaces of the sheet, means for regulating such pressure, means for rotating the rolls and thereby moving the sheet between them, the surface of each roll containing closely spaced, narrow elongated grooves which encircle the respective rolls, and means for supplying lubricant to the sheet ahead of the rolls.

6. The process of applying drawing lubricant to a metal surface which comprises covering a portion of the surface with a continuous layer of the lubricant, converting this layer into closely spaced, elongated threads of the lubricant each of substantially uniform width and height, and maintaining the amount of lubricant in said continuous layer in excess of that required to maintain the volume of the threads constant, whereby there is produced a uniform volume of the lubricant per unit area of the metal, and then allowing the threads to spread into a substantially uniform covering over the surface.

7. The process of claim 6 in which the metal is moved with respect to the position of the continuous layer and threads which is substantially constant.

References Cited in the file of this patent

UNITED STATES PATENTS

| | | |
|---|---|---|
| 1,501,048 | Hampson | July 15, 1924 |
| 1,598,302 | Norton | Aug. 31, 1926 |
| 2,294,513 | Pearson | Sept. 1, 1942 |